July 7, 1936. H. F. PHILLIPS ET AL 2,046,840
SCREW DRIVER
Filed Jan. 15, 1935
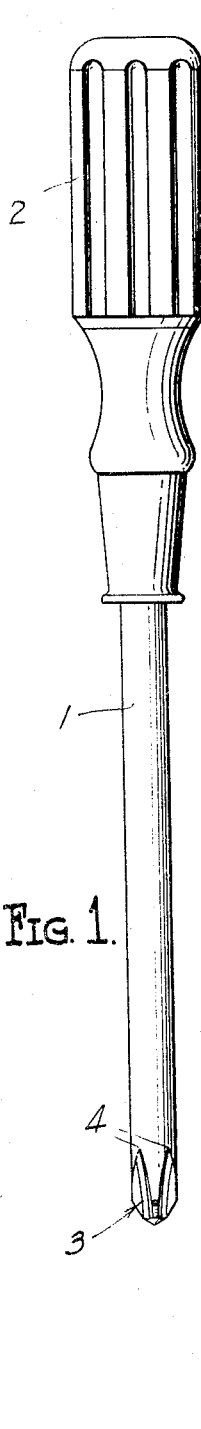
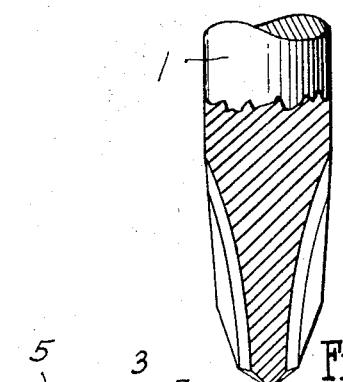
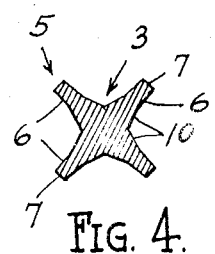
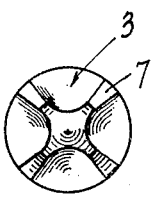
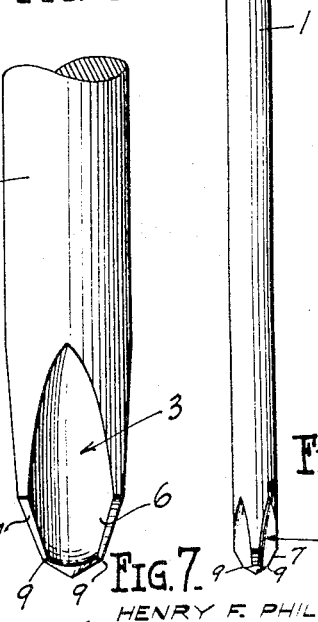
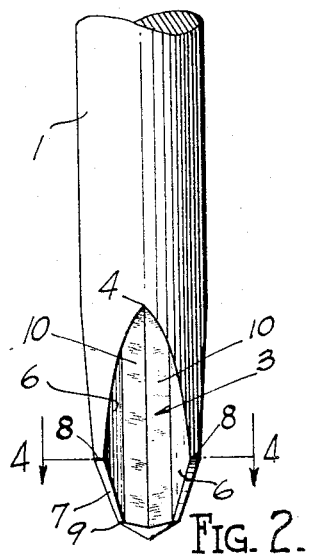
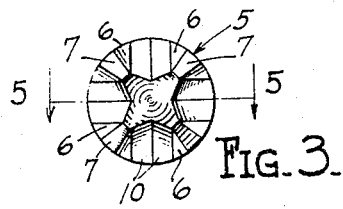
HENRY F. PHILLIPS
AND THOMAS M. FITZPATRICK
INVENTOR.
BY James D. Givnan
ATTORNEYS.

Patented July 7, 1936

2,046,840

UNITED STATES PATENT OFFICE 2,046,840

SCREW DRIVER

Henry F. Phillips, Piedmont, Calif., and Thomas M. Fitzpatrick, New York, N. Y., assignors to Phillips Screw Company, Wilmington, Del.

Application January 15, 1935, Serial No. 1,947

10 Claims. (Cl. 145—50)

This invention is directed to new and useful improvements in tools, the nature of which is specifically outlined in an application for Letters Patent of the United States, entitled Screw drivers, Serial Number 670,117, filed May 9, 1933, of which this application is a continuation in part. As therein pointed out, the principal object of the invention is to provide a screw driver formed at one of its ends with a bit of special configuration to fit precisely within a recess of corresponding shape formed in the head of all sizes of screws for driving the same. The invention also embraces the production of punches for punching the recesses in said screws and we, therefore, do not wish to be limited merely to screw drivers.

Hitherto the manufacture of screws with a cruciform or other shape of aperture has been impractical, several proposed types requiring casting, which is so expensive as to make manufacturing costs prohibitive. Other types require broaching, but this operation pushes the metal ahead of the tool, and so disturbs the distribution of metal as to render the screw head extremely fragile.

Ordinary screws are cut, rolled or stamped by automatic machinery and cost but a few cents per hundred to produce. It is, therefore, one of the principal objects of the present invention to provide a tool which may be used with automatic machinery to punch recesses in the heads of screws in such a way that all of the desirable virtues of the screw head and the recesses therein are retained, and which results in certain additional advantages, namely, the screw head is left stronger near the outer edge than heretofore possible, the recess firmly and accurately receives the driver, and causes the driver to centralize itself with respect to the screw head.

Moreover, the new and novel construction of our tool produces a screw driver having substantial core portion with equally strong radiating vanes or gripping surfaces for engagement with the grooved portions of the recess in the screw head. Thus we provide a tool of maximum strength and at the same time one which when used as a punch, forms a punched recess in a most efficient manner, by permitting the proper flow and distribution of the metal without causing any of the disadvantages as above pointed out in reference to other types of punches, broaches and the like.

These and other objects will appear as our invention is more fully hereinafter described in the following specification, illustrated in the accompanying drawing and finally pointed out in the appended claims.

In the drawing:

Figure 1 is a side elevation of our new and improved form of screw driver.

Figure 2 is an enlarged fragmentary view of the lower end of Figure 1 with the tool rotated through 45 degrees of a circle.

Figure 3 is an end elevation of Figure 2.

Figure 4 is a sectional view taken on the line 4—4 of Figure 2.

Figure 5 is a sectional side elevation of Figure 3 taken on the line 5—5 of Figure 3.

Figure 6 is a side elevation of a modified form of tool.

Figure 7 is an enlarged fragmentary view of the lower end of the tool shown in Figure 6 with the same rotated through 45 degrees of a circle.

Figure 8 is an end elevation of Figure 7.

Referring now more particularly to the drawing:

Reference numeral 1 indicates the shank of the tool which is provided at one of its ends with any suitable form of gripping means, such for instance, as a handle 2, or this end of the shank may be formed into any suitable shape to provide gripping means for operative engagement with a power driven tool, or the same may be adapted for engagement with punching machinery when the tool is to be used as a punch.

The opposite or front end of the shank, as shown in Figures 1 to 4, is formed with a bit including a plurality of flutes or recesses generally indicated at 3, which preferably originate at equidistant points 4 on the surface of the shank. The bit is generally polygonal in horizontal cross-section, that is, transversely of the axis of the bit. The outer edges of the flutes diverge from their points of origin toward the lower end of the bit. Those portions of the shank intermediate the edges of the flutes converge into vanes 5 which are formed with flat tapered side walls 6 and an outer wall, the front surface 7 of which, inclines inwardly toward the axis of the bit. The inclined portions 7 of the outer walls of the vanes form the front ends of the vanes. By reason of the tapering side walls 6, it will be seen that the vanes are of gradually increasing thickness from their outer edges toward the axis of the bit which produces a strong construction and obviates any danger of breaking the vane by any side loads thrust thereagainst.

The lower or front ends of the vanes taper from points 8 on the surface of the shank to diametrically opposed points 9 around the longitudinal axis of the shank. That is, the thickness of each vane gradually increases from the surface 7 rearwardly in a direction longitudinally of the bit. The area between the points 9 may be regarded as the core, and it is of vital importance to the successful operation of the tool, either as a punch or as a screw driver, that the core portion be as large and strong as possible and at the same time allow sufficient depth to the flutes, and radial dimensions to the vanes. The lowermost end of the core portion may be either flat, pointed, or rounded. The particular shape is immaterial so long as a blunt and durable end is provided.

The bottom surface of each flute or recess 3 is generally concave and merges with the side walls of the two adjacent vanes. Such bottom surface may comprise a plurality of contiguous walls 10 which merge at an angle with the bottom edges of the flat tapering side walls 6 of the vanes 5, as shown in Figures 2, 3, and 4, or such bottom surfaces may be made concave or curved as shown in Figures 7 and 8. In either form, however, the proper size or sectional area of the core portion must be maintained and the vanes must be formed with tapering side walls, as above pointed out, which merge with the bottoms of the flutes or recesses.

With either form of tool when used as a punch with the usual automatic machinery, recesses may be quickly and accurately formed in blank screw heads without first forming a pilot hole, or other opening therein, to be subsequently enlarged by the inward thrust of the punch, as is the customary practice in punching recesses of certain other types.

We claim:

1. A tool having a shank and a bit, said bit being of generally polygonal configuration in horizontal cross-section and comprising a plurality of screw engaging vanes arranged longitudinally of the bit and extending radially of the axis thereof, each of said vanes being of gradually increasing thickness in horizontal cross-section from the outer edge thereof toward the axis of the bit, and each vane having an outer wall which inclines inwardly toward the axis of the bit.

2. A tool having a shank provided with a bit at the front end thereof, said bit being of generally polygonal configuration in horizontal cross-section and comprising a plurality of radially arranged tapered screw engaging vanes, each vane having flat tapered side walls, the distance between which walls gradually increases from the outer edge of the vane inwardly toward the axis of the bit, each of said vanes also having a front outer wall which inclines inwardly toward the axis of the bit.

3. A tool having a shank provided with a bit at its front end, said bit being of generally polygonal configuration in horizontal cross-section, said bit comprising a plurality of radially arranged vanes, each vane having an outer wall which inclines toward the axis of the bit from a point rearwardly of the front end of the bit, each of said vanes being of gradually increasing thickness in horizontal cross-section from the outer edge thereof inwardly toward the axis of the bit, and each vane also being of gradually increasing thickness in longitudinal cross-section from the front end toward the rear thereof.

4. A tool having a shank provided with a bit at its front end, said bit being of generally polygonal configuration in horizontal cross-section, said bit comprising a plurality of radially arranged vanes and a flute or recess between each two adjacent vanes, each vane having an outer wall the front portion of which inclines inwardly toward the axis of the bit, each of said vanes being of gradually increasing thickness in horizontal cross-section from the outer edge thereof toward the axis of the bit, each of said recesses being generally concave in form and each having the bottom wall thereof merging with the side walls of two adjacent vanes.

5. A tool as claimed in claim 4, wherein the said recesses between the vanes are generally concave in form and each comprising a plurality of contiguous walls.

6. A tool comprising a shank and a bit, said bit being of generally polygonal configuration in horizontal cross section and comprising a plurality of tapered screw engaging vanes, each vane having flat tapered side walls and a tapered outer wall, the recesses between said vanes being generally concave and comprising a plurality of contiguous walls intermediate the vanes, the said contiguous walls merging at an angle with the edges of said side walls of the vanes and being formed of a plurality of angularly disposed faces.

7. A tool comprising a shank and a bit, said bit being of generally polygonal configuration in horizontal cross section and comprising a plurality of tapered screw engaging vanes, each vane having flat tapered side walls and a tapered outer wall, the recesses between said vanes being generally concave and comprising a plurality of contiguous walls intermediate the vanes, the said contiguous walls merging at an angle with the edges of said side walls of the vanes and being formed of a plurality of angularly disposed faces, and the lowermost end of the bit being substantially convex in form.

8. A tool comprising a shank and a bit, said bit being of generally square configuration in horizontal cross section and comprising a plurality of equidistant and diametrically opposed tapered screw engaging vanes, each vane having flat tapered side walls and a tapered outer wall, the recesses between said vanes being generally concave and comprising a plurality of contiguous walls intermediate the vanes, the said contiguous walls merging at an angle with the edges of said side walls of the vanes and being formed of a plurality of angularly disposed faces.

9. A tool comprising a shank and a bit, said bit being of substantially square configuration in horizontal cross section and comprising four equidistant and diametrically opposed tapered screw engaging vanes, each vane having flat tapered side walls and a tapered outer wall, the recesses between said vanes being generally concave and comprising a plurality of contiguous walls intermediate the vanes, the said contiguous walls merging at an angle with the edges of said side walls of the vanes and being formed of a plurality of angularly disposed faces.

10. A tool comprising a cylindrical shank having gripping means secured to one of its ends and its opposite end formed with a plurality of flutes, said flutes originating at equidistant points on the surface of the shank spaced from the end of the tool and diverging toward the end of the tool, the side and bottom walls of said flutes comprising a plurality of angular smooth-faced surfaces extending from said points of origin of the flutes to the ends thereof, the adjacent side walls of said flutes uniting into vanes whose outer walls taper from said equidistant surface points to equidistant points adjacent the end of the tool, the lower ends of said vanes being inclined toward the longitudinal axis of the shank.

HENRY F. PHILLIPS.
THOMAS M. FITZPATRICK.